US008245150B2

(12) United States Patent
Katter, Jr. et al.

(10) Patent No.: US 8,245,150 B2
(45) Date of Patent: Aug. 14, 2012

(54) PARTS CATALOG SYSTEM

(75) Inventors: James G. Katter, Jr., Dunlap, IL (US); Dennis L. Faux, Pekin, IL (US); David H. Bigelow, Greenwood, IN (US); William C. Hurt, II, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1656 days.

(21) Appl. No.: 11/244,064

(22) Filed: Oct. 6, 2005

(65) Prior Publication Data

US 2006/0178944 A1 Aug. 10, 2006

(51) Int. Cl.
*G06F 3/00* (2006.01)
*G06F 3/048* (2006.01)

(52) U.S. Cl. ........ 715/780; 345/632; 345/661; 345/689; 707/708; 707/709; 707/712; 707/729; 715/255; 715/705; 715/711; 715/764; 715/765; 715/849; 715/853; 715/856; 715/964

(58) Field of Classification Search ............ 705/27; 715/255, 705, 711, 764–765, 780, 848–849, 715/853, 856, 964
See application file for complete search history.

(56) References Cited

U.S. PATENT DOCUMENTS

| | | | | |
|---|---|---|---|---|
| 5,231,566 A | * | 7/1993 | Blutinger et al. | 705/27 |
| 5,367,627 A | * | 11/1994 | Johnson | 715/708 |
| 5,444,844 A | * | 8/1995 | Inoue et al. | 705/27.1 |
| 5,461,709 A | * | 10/1995 | Brown | 715/848 |
| 5,526,478 A | * | 6/1996 | Russell et al. | 715/202 |
| 5,528,490 A | * | 6/1996 | Hill | 717/168 |
| 5,548,706 A | * | 8/1996 | Koizumi et al. | 715/255 |
| 5,581,676 A | * | 12/1996 | Ueno | 345/440 |
| 5,675,784 A | * | 10/1997 | Maxwell et al. | 1/1 |
| 5,708,805 A | | 1/1998 | Okamoto et al. | |
| 5,729,750 A | * | 3/1998 | Ishida | 715/209 |
| 5,740,425 A | * | 4/1998 | Povilus | 1/1 |
| 5,774,720 A | * | 6/1998 | Borgendale et al. | 719/329 |

(Continued)

FOREIGN PATENT DOCUMENTS

WO WO 01/09742 A2 2/2001

OTHER PUBLICATIONS

Marketing presentation for "Power Configurator," Acatec Rapid Sales and Engineering, Acatec Software GmbH, 2005.

*Primary Examiner* — Steven B. Theriault
(74) *Attorney, Agent, or Firm* — Finnegan, Henderson, Farabow, Garrett & Dunner LLP

(57) ABSTRACT

A parts catalog system is provided. The system may include a processor and a computer-readable medium operatively coupled to the processor and including a memory in which is stored a database configured to catalog collections of data associated with and identifying hardware items. The system may also include a graphical user interface (GUI) configured to display at least some of the data associated with and identifying a hardware item including. The displayed data may include a graphical representation of the hardware item. The displayed data may also include a data field integrated with the graphical representation illustrating the physical significance of the data within the data field with regard to the hardware item illustrated by the graphical representation. The data field may also be configured to accept input to designate a desired value for the data within the data field.

20 Claims, 8 Drawing Sheets

U.S. PATENT DOCUMENTS

| | | | | |
|---|---|---|---|---|
| 5,835,693 | A * | 11/1998 | Lynch et al. | 345/473 |
| 5,838,965 | A | 11/1998 | Kavanagh et al. | |
| 5,845,288 | A * | 12/1998 | Syeda-Mahmood | 1/1 |
| 5,861,889 | A * | 1/1999 | Wallace et al. | 345/619 |
| 5,873,080 | A * | 2/1999 | Coden et al. | 1/1 |
| 5,890,175 | A * | 3/1999 | Wong et al. | 715/236 |
| 5,897,639 | A * | 4/1999 | Greef et al. | 705/26.8 |
| 5,970,471 | A * | 10/1999 | Hill | 705/26.8 |
| 5,983,219 | A * | 11/1999 | Danish et al. | 1/1 |
| 6,002,855 | A * | 12/1999 | Ladner et al. | 703/1 |
| 6,014,127 | A * | 1/2000 | Blomqvist | 715/856 |
| 6,041,326 | A * | 3/2000 | Amro et al. | 1/1 |
| 6,072,481 | A * | 6/2000 | Matsushita et al. | 1/1 |
| 6,128,020 | A * | 10/2000 | Arimatsu et al. | 345/420 |
| 6,167,383 | A * | 12/2000 | Henson | 705/26.5 |
| 6,169,992 | B1 | 1/2001 | Beall et al. | |
| 6,275,821 | B1 * | 8/2001 | Danish et al. | 707/3 |
| 6,285,369 | B1 * | 9/2001 | Kross et al. | 345/419 |
| 6,292,190 | B1 * | 9/2001 | Corn | 345/427 |
| 6,324,534 | B1 * | 11/2001 | Neal et al. | 1/1 |
| 6,337,700 | B1 * | 1/2002 | Kinoe et al. | 715/854 |
| 6,377,296 | B1 * | 4/2002 | Zlatsin et al. | 348/143 |
| 6,396,522 | B1 * | 5/2002 | Vu | 715/848 |
| 6,480,188 | B1 * | 11/2002 | Horsley | 345/184 |
| 6,484,182 | B1 * | 11/2002 | Dunphy et al. | 700/231 |
| 6,496,195 | B1 * | 12/2002 | Gill et al. | 345/619 |
| 6,611,725 | B1 * | 8/2003 | Harrison et al. | 700/98 |
| 6,625,607 | B1 * | 9/2003 | Gear et al. | 1/1 |
| 6,629,093 | B1 * | 9/2003 | Davis et al. | 707/722 |
| 6,647,305 | B1 * | 11/2003 | Bigelow | 700/97 |
| 6,668,254 | B2 | 12/2003 | Matson et al. | |
| 6,674,428 | B2 * | 1/2004 | Horsley | 345/184 |
| 6,687,557 | B2 * | 2/2004 | Ouchi | 700/95 |
| 6,728,706 | B2 * | 4/2004 | Aggarwal et al. | 1/1 |
| 6,750,884 | B1 * | 6/2004 | Steigerwald et al. | 715/771 |
| 6,766,331 | B2 | 7/2004 | Shema et al. | |
| 6,871,198 | B2 * | 3/2005 | Neal et al. | 1/1 |
| 6,904,392 | B1 * | 6/2005 | Marty et al. | 703/1 |
| 6,907,424 | B1 * | 6/2005 | Neal et al. | 707/706 |
| 6,907,573 | B2 * | 6/2005 | Kohls et al. | 715/764 |
| 6,920,459 | B2 * | 7/2005 | Dedhia et al. | 707/740 |
| 6,950,113 | B2 * | 9/2005 | Gill et al. | 345/619 |
| 6,988,095 | B1 * | 1/2006 | Dorfman | 1/1 |
| 7,002,585 | B1 * | 2/2006 | Watanabe et al. | 345/475 |
| 7,003,371 | B2 * | 2/2006 | Tsuchida et al. | 700/182 |
| 7,076,412 | B1 * | 7/2006 | Davis | 703/7 |
| 7,088,360 | B1 * | 8/2006 | Davis et al. | 345/420 |
| 7,158,853 | B2 * | 1/2007 | Sakai et al. | 700/182 |
| 7,197,479 | B1 * | 3/2007 | Franciscus de Heer et al. | 705/26.62 |
| 7,218,979 | B2 * | 5/2007 | Tsuji | 700/97 |
| 7,246,085 | B2 * | 7/2007 | Kamon et al. | 705/27.2 |
| 7,248,007 | B2 * | 7/2007 | Svobodnik | 318/400.01 |
| 7,266,515 | B2 * | 9/2007 | Costello et al. | 705/26.8 |
| 7,299,202 | B2 * | 11/2007 | Swanson | 705/26.5 |
| 7,401,097 | B1 * | 7/2008 | Baer et al. | 1/1 |
| 7,469,242 | B2 * | 12/2008 | Tompras et al. | 1/1 |
| 7,478,060 | B2 * | 1/2009 | Goldsmith et al. | 705/29 |
| 7,505,954 | B2 * | 3/2009 | Heidloff et al. | 1/1 |
| 7,512,553 | B2 * | 3/2009 | Chidiac et al. | 705/28 |
| 7,533,336 | B2 * | 5/2009 | Jaffe et al. | 715/243 |
| 7,568,162 | B2 * | 7/2009 | Gunturi et al. | 715/763 |
| 7,598,968 | B2 * | 10/2009 | Connor et al. | 345/661 |
| 7,617,184 | B2 * | 11/2009 | Ferrari et al. | 1/1 |
| 7,620,904 | B1 * | 11/2009 | Davis et al. | 715/764 |
| 7,636,096 | B2 * | 12/2009 | Mikulecky | 345/619 |
| 7,644,363 | B2 * | 1/2010 | Rogerson et al. | 715/715 |
| 7,672,822 | B2 * | 3/2010 | Lee et al. | 703/7 |
| 7,672,968 | B2 * | 3/2010 | Bradateanu et al. | 707/807 |
| 7,698,167 | B2 * | 4/2010 | Batham et al. | 705/26.62 |
| 7,716,089 | B1 * | 5/2010 | Gavarini | 705/26.8 |
| 7,778,995 | B2 * | 8/2010 | Qamhiyah et al. | 707/706 |
| 7,779,356 | B2 * | 8/2010 | Griesmer | 715/711 |
| 7,885,956 | B2 * | 2/2011 | Danish et al. | 707/723 |
| 7,890,878 | B2 * | 2/2011 | Bass et al. | 715/764 |
| 7,895,531 | B2 * | 2/2011 | Radtke et al. | 715/810 |
| 2001/0056385 | A1 * | 12/2001 | Timms et al. | 705/27 |
| 2001/0056436 | A1 * | 12/2001 | Stejskal et al. | 707/200 |
| 2002/0010655 | A1 * | 1/2002 | Kjallstrom | 705/27 |
| 2002/0062258 | A1 * | 5/2002 | Bailey et al. | 705/26 |
| 2002/0077921 | A1 * | 6/2002 | Morrison et al. | 705/26 |
| 2002/0080194 | A1 * | 6/2002 | Fujieda | 345/853 |
| 2002/0091690 | A1 * | 7/2002 | Bailey et al. | 707/6 |
| 2002/0107673 | A1 * | 8/2002 | Haller et al. | 703/1 |
| 2002/0184218 | A1 * | 12/2002 | Bailey et al. | 707/9 |
| 2002/0194190 | A1 | 12/2002 | Shema et al. | |
| 2003/0023512 | A1 * | 1/2003 | Festa et al. | 705/27 |
| 2003/0078676 | A1 * | 4/2003 | Kuribayashi et al. | 700/1 |
| 2003/0163214 | A1 * | 8/2003 | Ouchi | 700/97 |
| 2003/0187751 | A1 * | 10/2003 | Watson et al. | 705/26 |
| 2004/0083135 | A1 * | 4/2004 | Chau | 705/26 |
| 2004/0117233 | A1 * | 6/2004 | Rapp, III | 705/9 |
| 2004/0133572 | A1 * | 7/2004 | Bailey et al. | 707/3 |
| 2004/0167833 | A1 | 8/2004 | Schickler | |
| 2004/0199434 | A1 * | 10/2004 | Tanaka et al. | 705/27 |
| 2004/0236540 | A1 * | 11/2004 | Tsuji et al. | 703/1 |
| 2004/0254852 | A1 * | 12/2004 | Myoki et al. | 705/26 |
| 2005/0028107 | A1 * | 2/2005 | Gomes et al. | 715/762 |
| 2005/0120010 | A1 * | 6/2005 | Philpott et al. | 707/3 |
| 2005/0278652 | A1 * | 12/2005 | Scholz | 715/780 |
| 2005/0288920 | A1 * | 12/2005 | Green et al. | 704/3 |
| 2006/0053071 | A1 * | 3/2006 | Yamada et al. | 705/29 |
| 2007/0130029 | A1 * | 6/2007 | Von Helmolt et al. | 705/27 |
| 2011/0167377 | A1 * | 7/2011 | Bass et al. | 715/780 |

* cited by examiner

ENGINEERING PART NUMBER SEARCH OPTIONS - DEFAULT FOR ALL USERS

WELCOME TO THE PARTS CATALOG!

YOU MAY SEARCH/NAVIGATE PRODUCTS USING THE TREE,
OR SEARCH FOR SPECIFIC PART NUMBERS USING THE FIELDS BELOW.

PART NUMBER: [ ]   VERSION: [ ]   CHG-LEVEL: [ ]
◉ ENGINEERING   ○ MANUFACTURING   ○ ALL

FORCE PART-NUMBER VERIFICATION RULES: ☐   [RESET]   [SUBMIT]
DISPLAY RESULTS IN:   ◉ METRIC   ○ ENGLISH

READY FOR SEARCH!

..::CONTACT SUPPORT::..

*FIG. 6*

ENGINEERING / ALL PART NUMBER SEARCH OPTIONS
NOTE - INVENTORY CODE IS A SEARCHABLE FIELD NOW

WELCOME TO THE PARTS CATALOG!

YOU MAY SEARCH/NAVIGATE PRODUCTS USING THE TREE,
OR SEARCH FOR SPECIFIC PART NUMBERS USING THE FIELDS BELOW.

INV CODE: [ ]   PART NUMBER: [ ]   VERSION: [ ]   CHG-LEVEL: [ ]
○ ENGINEERING   ◉ MANUFACTURING   ○ ALL

FORCE PART-NUMBER VERIFICATION RULES: ☐   [RESET]   [SUBMIT]
DISPLAY RESULTS IN:   ◉ METRIC   ○ ENGLISH

READY FOR SEARCH!
..::CONTACT SUPPORT::..

| | | LOW LEVEL SECURITY USERS | | | |
|---|---|---|---|---|---|
| ITEM | PART_NUMBER | VER | CHG_LVL | DESCRIPTION | |
| | BOLTS AND SCREWS/HEX HEAD | | | THD_SIZE-THD-PTCH X OAL<br>MATL: MATERIAL | |
| 1 | 0310214 | - | 01 | 1/4"-20 x 12.7mm<br>MATL: STEEL 1035 MPa MIN TENSILE STRENGTH RC 33-39 | |
| 2 | 0310215 | - | 03 | 1/4"-20 x 15.875mm<br>MATL: STEEL 1035 MPa MIN TENSILE STRENGTH RC 33-39 | |
| 3 | 0310216 | - | 03 | 1/4"-20 x 19.05mm<br>MATL: STEEL 1035 MPa MIN TENSILE STRENGTH RC 33-39 | |
| 4 | 0310218 | - | 02 | 3/8"-16 x 12.7mm<br>MATL: STEEL 1035 MPa MIN TENSILE STRENGTH RC 33-39 | |
| 5 | 0310221 | - | 01 | 1/2"-13 x 19.05mm<br>MATL: STEEL 1035 MPa MIN TENSILE STRENGTH RC 33-39 | |
| 6 | 0311208 | - | 00 | 5/16"-18 x 15.875mm<br>MATL: N/A | |
| 7 | 0314630 | - | 04 | 5/16"-18 x 19.05mm<br>MATL: STEEL 1035 MPa MIN TENSILE STRENGTH RC 33-39 | |
| 8 | 0325473 | - | 03 | 5/16"-18 x 12.7mm<br>MATL: STEEL 1035 MPa MIN TENSILE STRENGTH RC 33-39 | |
| | | | | SHOWING 1 - 8 OF 247 MATCHES | TOGGLE |
| | | --- NEXT 20 RECORDS --> | | | |

FIG. 9

| COMPARE | ITEM | PART_NUMBER | VER | CHG_LVL | DESCRIPTION | RSR |
|---|---|---|---|---|---|---|
| | | HIGH LEVEL SECURITY USERS | | | | |
| [ALL] [NO] | | BOLTS AND SCREWS/HEX HEAD | | | THD_SIZE-THD-PTCH X OAL<br>MATL: MATERIAL | |
| ☐ | 1 | 0310214 | - | 01 | 1/4"-20 x 12.7mm<br>MATL: ABC123 | 🔍 |
| ☐ | 2 | 0310215 | - | 03 | 1/4"-20 x 15.875mm<br>MATL: ABC123 | 🔍 |
| ☐ | 3 | 0310216 | - | 03 | 1/4"-20 x 19.05mm<br>MATL: ABC123 | 🔍 |
| ☐ | 4 | 0310218 | - | 02 | 3/8"-16 x 12.7mm<br>MATL: ABC123 | 🔍 |
| ☐ | 5 | 0310221 | - | 01 | 1/2"-13 x 19.05mm<br>MATL: ABC123 | 🔍 |
| ☐ | 6 | 0311208 | - | 00 | 5/16"-18 x 15.875mm<br>MATL: STEEL | 🔍 |
| ☐ | 7 | 0314630 | - | 04 | 5/16"-18 x 19.05mm<br>MATL: ABC123 | 🔍 |
| ☐ | 8 | 0325473 | - | 03 | 5/16"-18 x 12.7mm<br>MATL: ABC123 | 🔍 |
| | | | | | SHOWING 1 - 8 OF 247 MATCHES | TOGGLE |
| | | --- NEXT 20 RECORDS --> | | | | |

PARTS CATALOG SYSTEM

TECHNICAL FIELD

The present disclosure is directed to a parts catalog system and, more particularly, to a parts catalog system having a graphical user interface.

BACKGROUND

Design engineers, manufacturers, and parts suppliers often rely on parts catalog systems to facilitate research and development, repair, and/or parts supplying. Such parts catalog systems may include a computer-based search engine for locating, and/or retrieving hardware items (i.e., "parts") from one or more databases (i.e. "catalogs"). The benefits of a parts catalog system to a user may be measured in the speed, accuracy, and overall effectiveness in allowing users to search for and/or retrieve data about hardware items. That is, the more effective a parts catalog system is, the better a user's products and/or service will be, and the faster they may be able to develop products and/or provide services.

The effectiveness of a parts catalog system often depends, at least in part, on the intuitiveness with which a system display may be laid out and ease with which a user may discern how to navigate through the system and make use of its features. In order to improve the visual guidance provided by parts catalog systems, some parts catalog systems have included a graphical user interface (GUI). GUIs are often configured to display graphical representations of hardware items stored in the catalog. Being able to visualize an image of a retrieved part can facilitate navigation and overall usage of the system because, among other reasons, a user can often readily discern from the image whether the retrieved part is the part that they are looking for or if it otherwise suits their needs.

Systems have been also been developed that not only display graphical representations of cataloged hardware items, but also enable searching for hardware items in a parts catalog by inputting values for attributes of the hardware items. For example, U.S. Pat. No. 6,647,305 to Bigelow ("the '305 patent") discloses a system configured to enable a user to specify attributes of a bolt in order to find a desired type and size bolt. The '305 patent discloses a graphical user interface configured to display a graphical representation of the bolt and provide a number of input fields for inputting the desired attributes for the bolt.

While the system of the '305 patent may provide a platform for searching for and retrieving data for cataloged hardware items, and provides a graphical representation of the hardware items along with input fields for inputting desired attributes for the items, improvements could be made to the system. For example, although input fields are provided along with the graphical representation, the placement of the input fields are displayed in a location substantially separate from the graphical representation. This layout provides no visual connection between an attribute value being inputted and the portion of the hardware item to which it refers. For example, the system of the '305 patent provides several choices for various size parameters of the displayed bolt. However, there is no visual correlation between, for example, the length parameter selection boxes and the length portion of the graphical representation of the bolt. Improvements could be made to this layout which may facilitate navigation and use, especially when dealing with complicated parts for which data for many attributes is listed.

The present disclosure is directed toward one or more improvements in existing parts catalog systems.

SUMMARY OF THE INVENTION

In one aspect, the present disclosure is directed to a parts catalog system. The system may include a processor and a computer-readable medium operatively coupled to the processor and including a memory in which is stored a database configured to catalog collections of data associated with and identifying hardware items. The system may also include a graphical user interface (GUI) configured to display at least some of the data associated with and identifying a hardware item. The displayed data may include a graphical representation of the hardware item. The displayed data may also include a data field integrated with the graphical representation illustrating the physical significance of the data within the data field with regard to the hardware item illustrated by the graphical representation. The data field may also be configured to accept input to designate a desired value for the data within the data field.

In another aspect, the present disclosure is directed to a method of using a parts catalog system. The method may include accessing a database configured to catalog collections of data associated with and identifying hardware items. The method may also include navigating within the system via a graphical user interface (GUI) configured to display at least some of the data associated with and identifying a hardware item. The displayed data may include a graphical representation of the hardware item. The method may further include inputting data into a data field integrated with the graphical representation illustrating the physical significance of the data within the data field with regard to the hardware item illustrated by graphical representation.

BRIEF DESCRIPTION OF THE DRAWINGS

FIG. 6 is a diagrammatic illustration of a graphical user interface (GUI) illustrating a part number search feature for users with a low level of security access.

FIG. 7 is a diagrammatic illustration of a graphical user interface (GUI) illustrating a part number search feature for users with a high level of security access.

FIG. 8 is a diagrammatic illustration of a graphical user interface (GUI) illustrating part number search results as displayed to users with a low level of security access.

FIG. 9 is a diagrammatic illustration of a graphical user interface (GUI) illustrating part number search results as displayed to users with a high level of security access.

DETAILED DESCRIPTION

Reference will now be made in detail to the drawings. Wherever possible, the same reference numbers will be used throughout the drawings to refer to the same or like parts.

Figure 1:
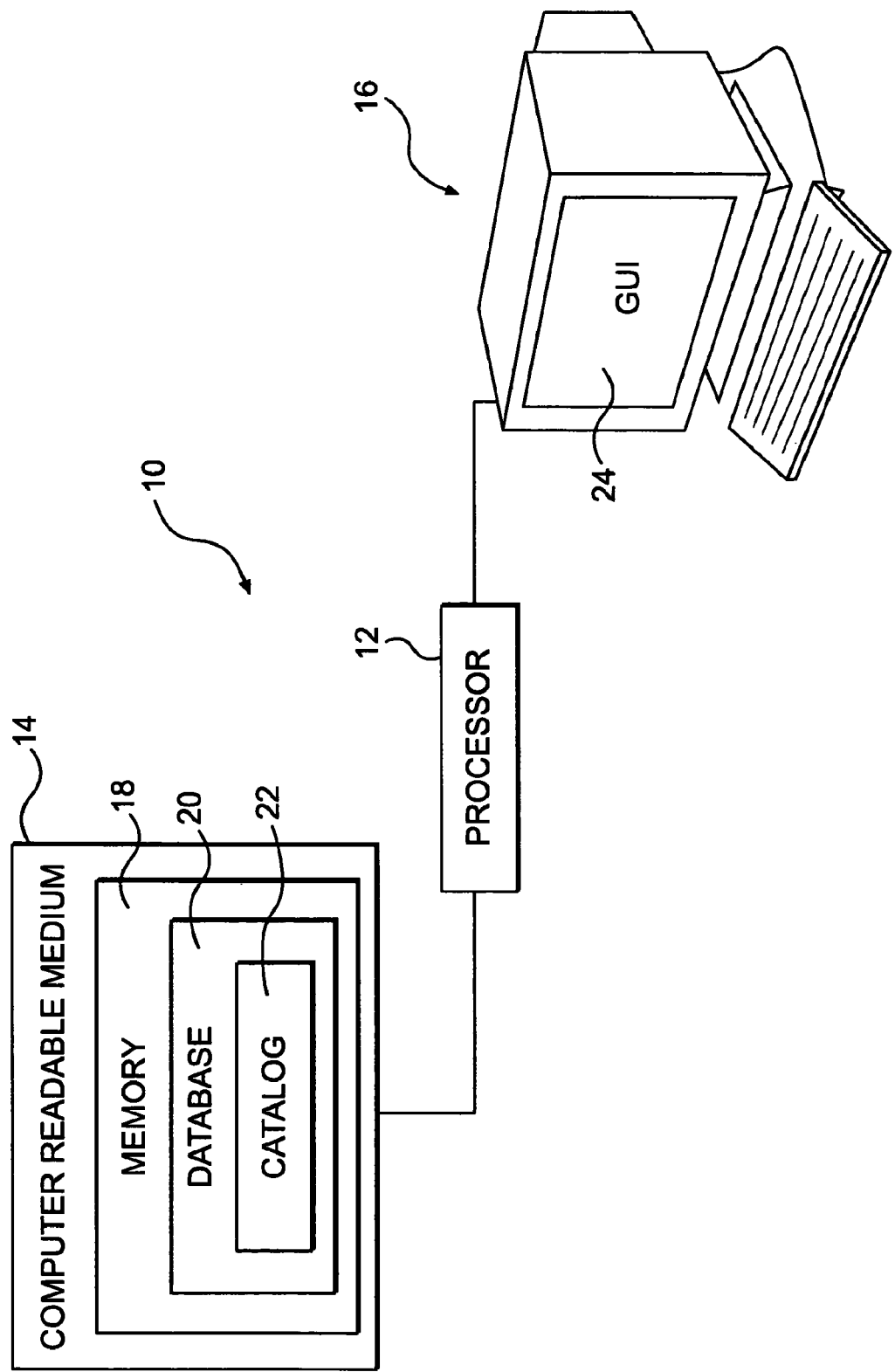
FIG. 1 is a diagrammatic illustration of a parts catalog system according to an exemplary disclosed embodiment.

FIG. 1 illustrates a parts catalog system 10. System 10 may include a processor 12 and a computer-readable medium 14 operatively coupled to processor 12, and a graphical user interface (GUI) 16.

Computer-readable medium 14 may include a memory 18 in which is stored collections of data associated with and identifying hardware items. For example, such data may be stored in at least one database 20 including at least one catalog 22. Computer-readable medium 14 may include any type of computer-readable medium including, for example computer chips and secondary storage devices, including hard disks, floppy disks, optical media, CD-ROM, or other forms of RAM or ROM.

GUI 16 may include any type of display device or equipment. For example, GUI 16 may include a display 24, which may be configured to provide visual feedback regarding system 10 and its components and functions.

Display 24 may be any kind of display, including, for instance, a screen display, as shown in FIG. 1. For example, display 24 may include a cathode ray tube (CRT), liquid crystal display (LCD), plasma screen, or the like. In addition to providing visual feedback regarding functions of system 10, display 24 may also be configured to accept input. In such an embodiment, display 24 may include, for example, a touch screen. Display 24 may also provide other information regarding any other device and/or system associated with system 10. System 10 may be Internet-based and, as such, may be displayed by display 24 as one or more web pages available on a local or global network.

Figure 2:
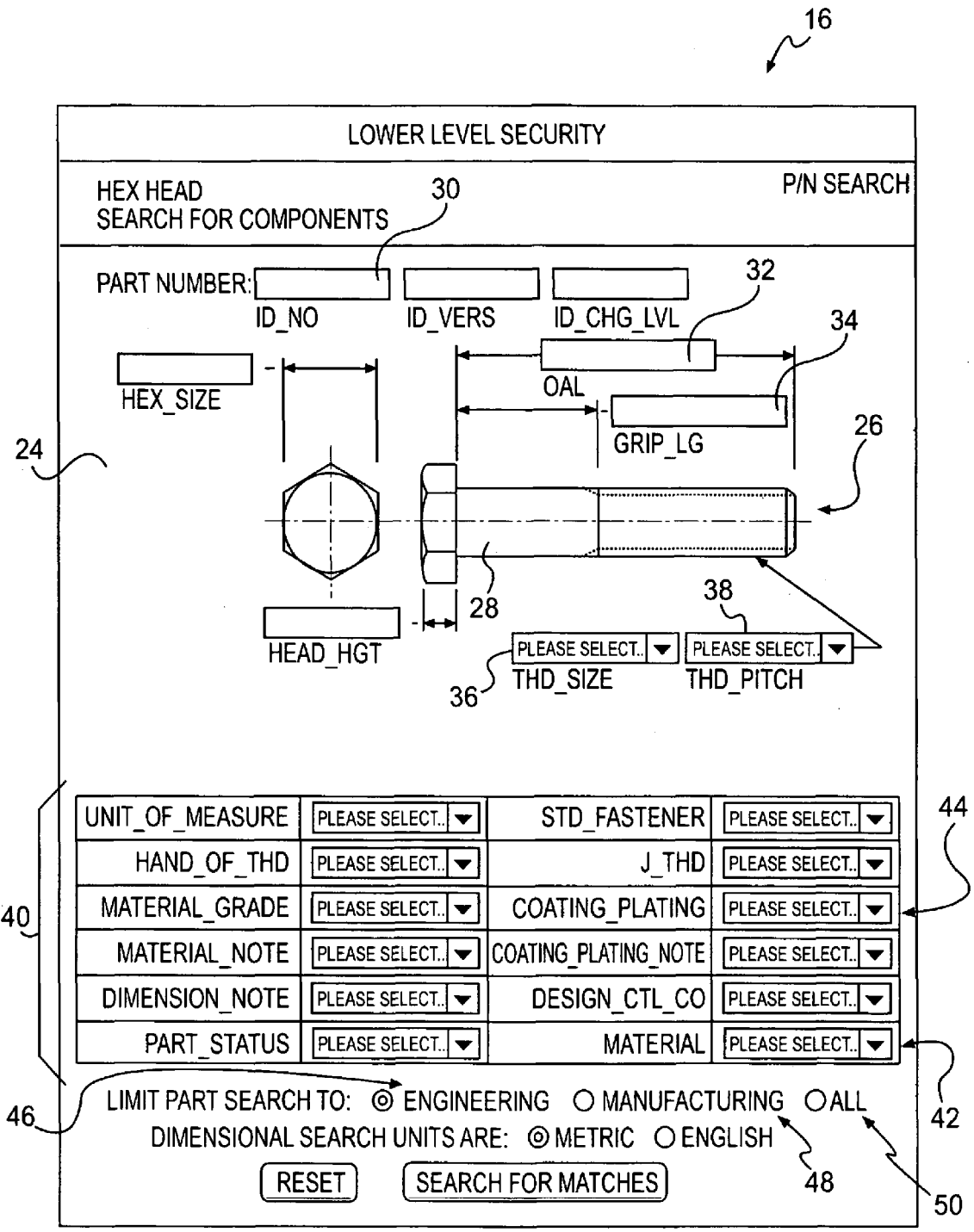
FIG. 2 is a diagrammatic illustration of a graphical user interface (GUI) illustrating data fields integrated with a graphical representation of a part as displayed to users with a low level of security access.

GUI 16 may be configured to display at least some of the data associated with and identifying a hardware item (i.e. part) stored in catalog 22. For example, as illustrated in FIG. 2, GUI 16 may be configured to display a graphical representation 26 of the hardware item. In FIG. 2, graphical representation 26 is illustrated as a hex head bolt 28. As also illustrated in FIG. 2, multiple views of the hardware item may be displayed.

GUI 16 may also be configured to display text data regarding one or more attributes of the hardware item. Alternatively or additionally, GUI 16 may be configured to display one or more data fields configured to contain data associated with the hardware item. Such data fields may include a part number field 30, as well as data fields for various dimensions and physical characteristics or attributes such as an overall length field 32 (OAL), a grip length field 34 (GRIP_LG), a thread size field 36 (THD_SIZE), a thread pitch field 38 (THD_PITCH), etc.

One or more of the data fields may be integrated with graphical representation 26, thus illustrating the physical significance of the data within the data field with regard to the hardware item illustrated by graphical representation 26. For example, overall length field 32 may be displayed integral with graphical representation 26 to illustrate the portion of bolt 28 that may be measured by an overall length dimension. Such integrated data fields may be positioned at any suitable place relative to graphical representation 26 that will illustrate some physical significance of the data within the data field with regard to the hardware item illustrated by graphical representation 26. For example, such integrated data fields may be within the boundaries of the hardware item, overlapping the hardware item, in the vicinity of a portion of the hardware item, etc. In some embodiments, the integrated data fields may be accompanied by dimensioning graphics, as illustrated by overall length field 32 and other dimension-related data fields illustrated in FIG. 2.

GUI 16 may also include data and/or search fields for other data associated with the hardware item. For example, as shown in a section 40 of FIG. 2, such fields may include data related to various other attributes of the hardware item, such as materials that the hardware item may be made of (MATERIAL field 42) or coatings that may be applied to the hardware item (COATING-PLATING field 44).

Further, one or more of the data fields may serve as search fields and, as such, may be configured to accept input to designate desired values for the data within the data field to facilitate searching for parts having particular characteristics and/or attributes (e.g., size, shape, material, etc.). System 10 may also be configured to enable narrowing of a search to one or more sub-categories, directories, or other portions of catalog 22. For example, as shown in FIG. 2, a user may be permitted to select either or both of an ENGINEERING sub-category 46, a MANUFACTURING sub-category 48, or ALL categories 50.

User access to system 10 and/or various aspects thereof may be regulated based on a plurality of security access categories. For example, various categories and/or levels of security access granted to a user may be based on whether or not a user is an in-house user of an organization hosting the system (e.g., an employee of the host organization) or an outside user (e.g., contract employee, vendor, etc.); the type of work a user does; the geographic region in which the user works; the business facility at which the user works; etc.

In-house users may include those who access system 10 from within a host organization of system 10. A host organization may include any company or other organization that hosts system 10 for use by its employees, its members, or other outside users; maintains system 10; and/or serves as administrator of system 10. An outside user may be one who accesses system 10 from outside the host organization (i.e., not in-house). For example, an outside user may include a customer (e.g., an engineer/designer who uses system 10). Another type of outside user may include an outside vendor (e.g., an entity that may supply the host organization with hardware components and/or systems). In some embodiments, outside users may access system 10 any number of ways, such as via the internet or via any other kind of communications data link or portal.

Different levels of security access may grant users access to various portions of catalog 22. For example, the outside user company may or may not be granted access rights to proprietary or otherwise confidential parts or parts data stored in catalog 22. Additionally or alternatively, the outside user may, based on their security access level, have access to different features and/or levels of performance of system 10. For example, depending on the access level, certain aspects of system 10 that the outside user company has access to may be more or less powerful, such as varying levels of detail/information displayed by GUI 16, and/or detail and function of navigation tools for viewing the contents of and retrieving items from catalog 22.

Figure 3:
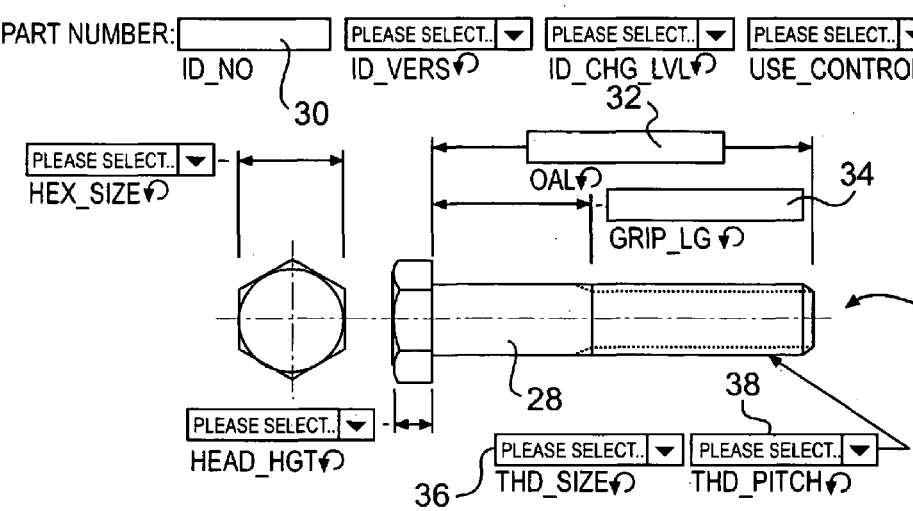
FIG. 3 is a diagrammatic illustration of a graphical user interface (GUI) illustrating data fields integrated with a graphical representation of a part as displayed to users with a high level of security access.

FIG. 2 illustrates an exemplary search display for a user with a lower level of security access. FIG. 3 illustrates an exemplary search display for a user with a higher level of security access. A section 52 of GUI 16, as shown in FIG. 3, may include more and/or different data, attributes of hardware items, data fields, etc. than section 40 in FIG. 2.

Figure 4:
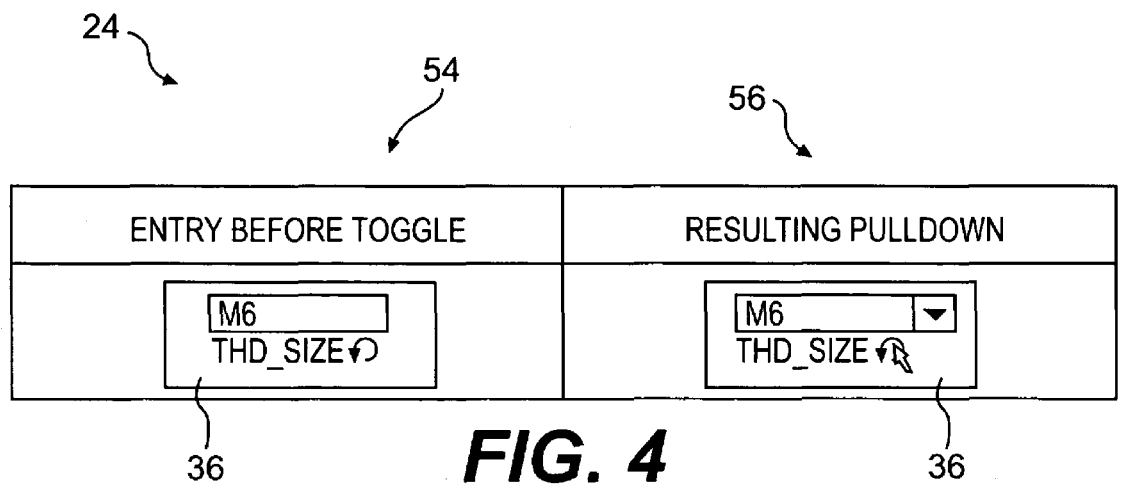
FIG. 4 is a diagrammatic illustration of a graphical user interface (GUI) before and after toggling from a data entry format to a pulldown menu selection format.
Figure 5:
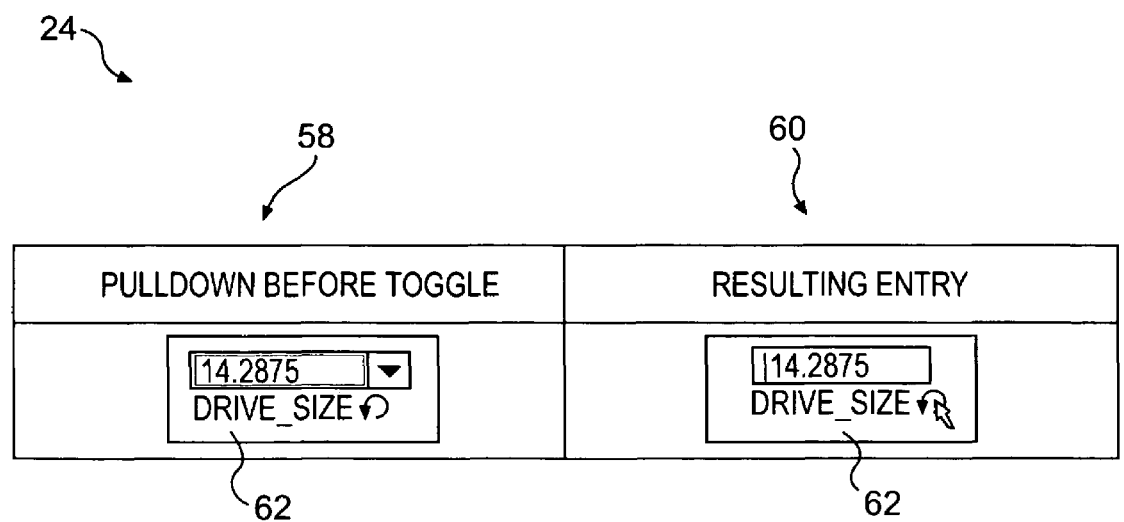
FIG. 5 is a diagrammatic illustration of a graphical user interface (GUI) before and after toggling from a pulldown menu selection format to a data entry format.

FIGS. 4 and 5 illustrate a search feature of system 10. Searchable data fields such as thread size field 36, as shown in FIG. 4, may be configured to accept an input value in two different input formats. For example, a user may utilize a data entry format, as shown in a data entry section 54, wherein data may be entered by typing into the field or cutting and pasting into the field. As an alternative, a user may choose to utilize a pulldown menu selection format shown in a pulldown menu section 56. A user may swap back and forth by toggling between the two input formats. As also indicated in FIG. 4, the data field may be configured to maintain the input value during the toggling. For example, FIG. 4 illustrates in section 54 a data entry of "M6," that may have been typed into thread size field 36. After toggling to the pulldown menu format illustrated in section 56, the entered data "M6" remains in thread size field 36 and may be included as part of the list of choices presented by the pulldown menu for thread size field 36. Similarly, FIG. 5 illustrates toggling from pulldown menu selection format, as shown in a pulldown menu section 58, to data entry format, as shown in data entry section 60. As in FIG. 4, it should be noted that system 10 may be configured to maintain a data selection, such as "14.2875" shown in a drive size field 62 (DRIVE_SIZE) in section 58, during toggling to data entry format, and thus, "14.2875" is also illustrated, in section 60, as remaining in drive size field 62 even after the toggling. Such a toggling feature may be available with one or more searchable data fields of system 10.

FIGS. 6 and 7 illustrate part number search displays for users with two different types of access or for searching two different portions of catalog 22. FIG. 6 illustrates a search display for searching an "engineering" database or for a user with authorization to search the "engineering" database (e.g., a design engineer). FIG. 7 illustrates a search display for searching a "manufacturing" database or for a user with authorization to search the "manufacturing" database (e.g., a manufacturing engineer, parts supplier, or parts retailer). An exemplary difference may be that, as shown in FIG. 7, the manufacturing search may include an inventory code field 64 (INV CODE).

System 10 may also include a part number search feature, which may enable system 10 to accept part number queries in multiple formats, and thereby process queries for part numbers that are submitted in incorrect formats. System 10 may, accept part number queries in an incorrect format, determine the proper format based on a set of rules, correct the format of the part number, and search an appropriate sub-category of catalog 22 for the corrected part number. For example, if a user enters a part number "5," but the correct part number is actually "0005," system 10 may be configured to determine that the proper format of the entered part number includes a total of four digits. System 10 may correct the format by adding in the three missing leading zeros to fill out the full four digit number and proceed to search for part number "0005" in catalog 22 or a portion thereof.

FIGS. 8 and 9 illustrate exemplary differences between search results as displayed for users having different security access levels. FIG. 8 illustrates a low level security display, whereas FIG. 9 illustrates a high level security display. Notable features illustrated in FIG. 9 include a comparing feature (COMPARE column 66) and a viewing feature (RSR column 68). In such an embodiment, high level security users may have the capability of comparing various parts retrieved by the search to one another using this comparing feature. High level security users may also have the capability of viewing an image of each part using this viewing feature. Another type of feature that may be available could be a differentiation between what information may be displayed and in what format. For example, a host organization may, as illustrated in FIG. 8, display materials information by type and properties (e.g., "Steel, 1035 MPa Min Tensile Strength") to users with low level security access. For users with high level security access, proprietary materials may be listed by a proprietary material code 70 (e.g., "ABC123").

An additional feature illustrated by FIGS. 8 and 9 is a toggle feature (TOGGLE button 72), whereby a user may toggle back and forth between search results displayed in metric or standard units. Such a toggling feature may convert the attribute data of the displayed parts from metric to standard and vice versa and/or the toggle feature may retrieve a different set of parts, i.e., one set of metric parts (e.g. a bolt with 5 mm diameter) and one set for standard units (e.g. a bolt with ¼ inch diameter). System 10 may be capable of toggling between any number of different unit systems and/or combinations thereof.

In addition to searching by part number, system 10 may also be navigated by other types of navigation systems. For example, system 10 may include a tree-based menu system and/or a graphics-based navigation system. In some embodiments, navigation within system 10 may be accomplished with either the tree-based menu system or the graphics-based system by switching between the two navigation systems.

Figure 10:
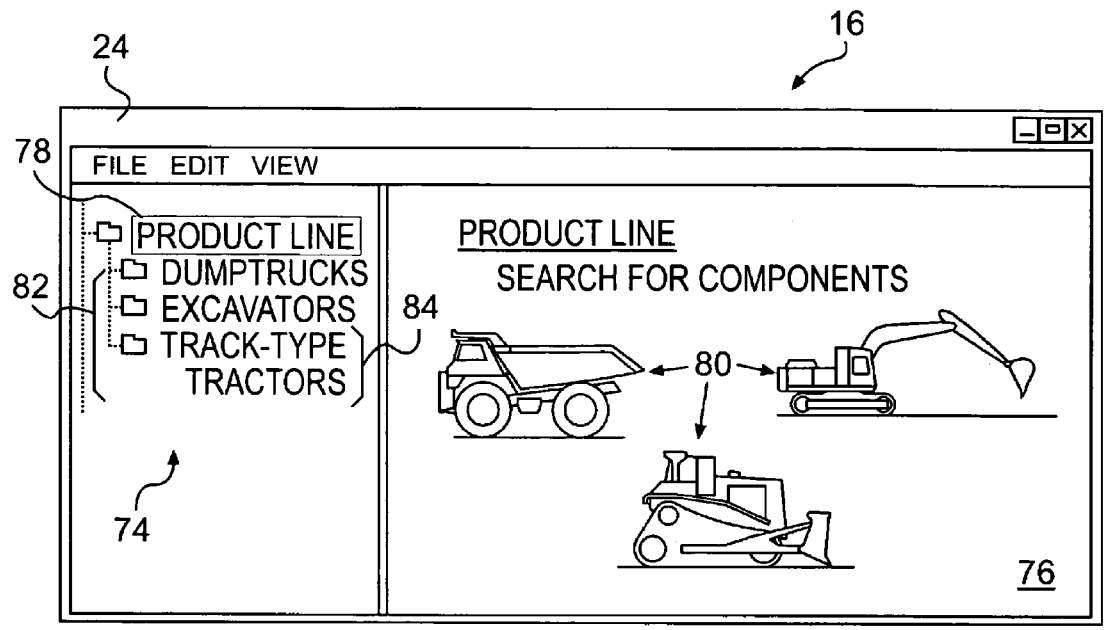
FIG. 10 is a diagrammatic illustration of a graphical user interface (GUI) illustrating a graphical representation aspect of a parts catalog system according to an exemplary disclosed embodiment.
Figure 11:
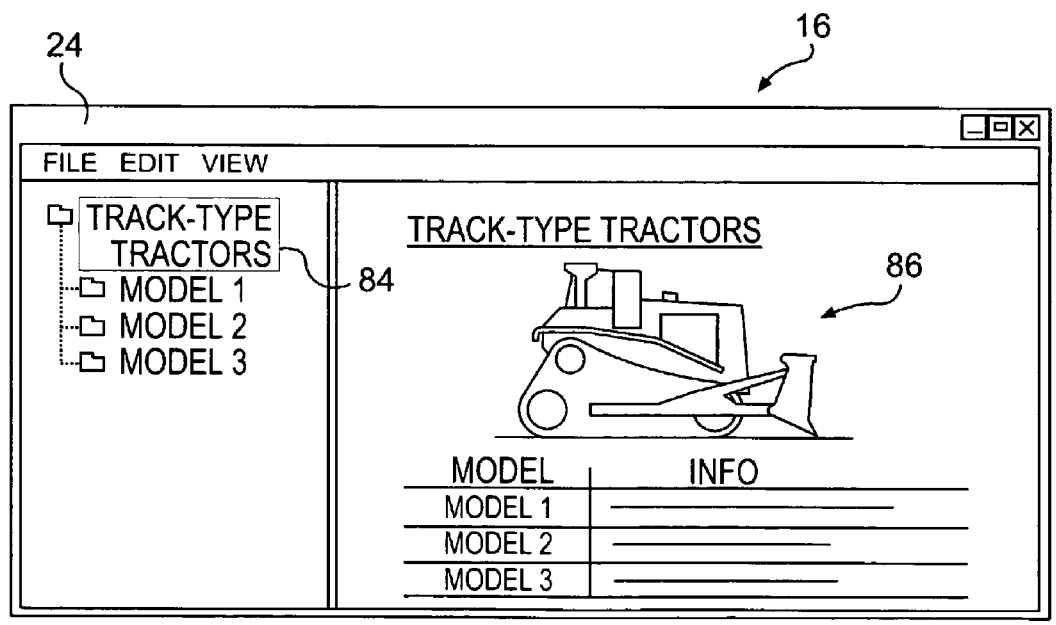
FIG. 11 is a diagrammatic illustration of a graphical user interface (GUI) illustrating another graphical representation aspect of a parts catalog system according to an exemplary disclosed embodiment.
Figure 12:
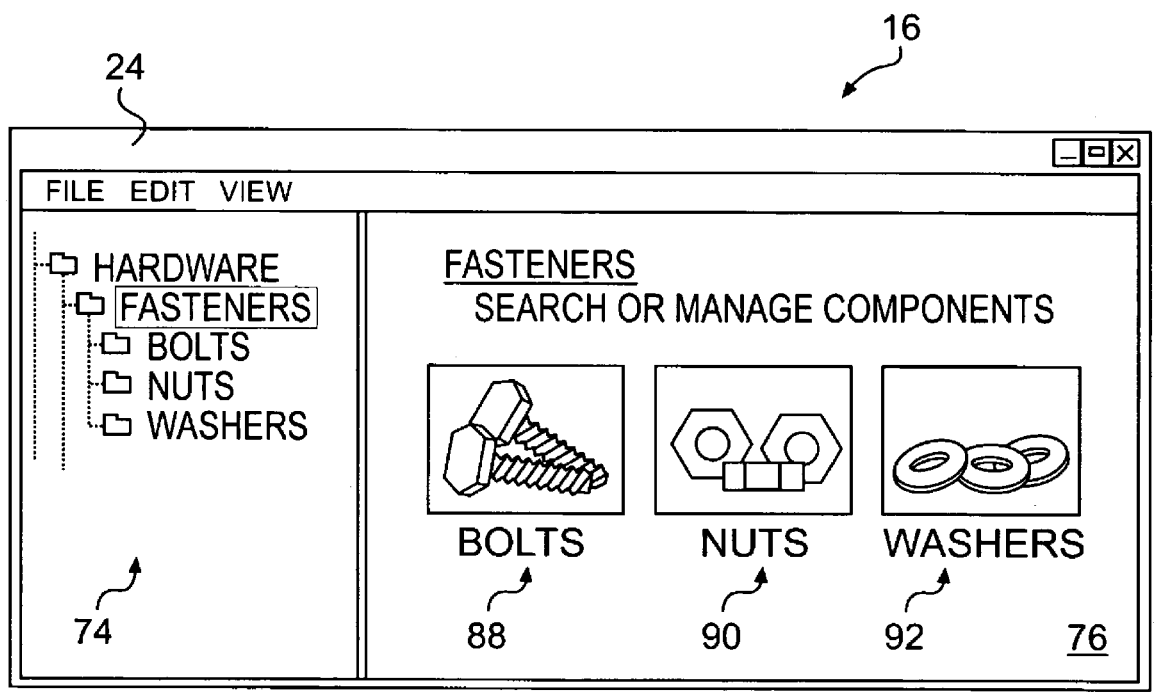
FIG. 12 is a diagrammatic illustration of a graphical user interface (GUI) illustrating another graphical representation aspect of a parts catalog system according to an exemplary disclosed embodiment.

FIGS. 10 through 12 illustrate a tree-based menu 74 displayed along side of a graphics-based portion 76 of GUI 16. When a higher level menu is selected, such as a PRODUCT LINE menu 78, as shown in FIG. 10, a number of graphical representations 80 of products or parts may be shown in graphics-based portion 76 that correspond with one or more sub-menus 82 of the high level menu. System 10 may be configured to accept input from a user via selection of one of graphical representations 80 or by selection of one of sub-menus 82. Upon selecting a TRACK-TYPE TRACTORS sub-menu 84 or by selecting the corresponding track-type tractor graphical representation 26 among graphical representations 80, system 10 may provide a display such as that shown in FIG. 11. A track-type tractor graphical representation 86 may be displayed. Track-type tractor graphical representation 86 may include one or more track-type tractors and/or multiple views of such tractors and/or components thereof (e.g., different models, work tools, etc.). Also, as shown in FIG. 11, additional information may be displayed about track-type tractors, including, for example, various models of track-type tractor and/or information associated with each model.

Navigating further through layers of menus and products, a user may view various parts associated with a particular type or model of product. For example, by choosing "MODEL 1" in FIG. 11, a user may be presented with an opportunity to select various components of model 1, such as, wheels, body panels, power train, electronics, wheels, work tools, hardware, etc. FIG. 12 illustrates a display presented upon selecting "HARDWARE" and, within the hardware menu, selecting "FASTENERS." FIG. 12 illustrates graphical representations of bolts 88, nuts 90, and washers 92. Selecting, for example, "bolts," either in tree-based menu 74 or from graphics-based portion 76, may retrieve a search result much like that of FIGS. 8 and 9. Such a search result may display the bolts that may be found on or in a model 1 track-type tractor.

INDUSTRIAL APPLICABILITY

The disclosed parts catalog system may be applicable to any kind of hardware items. For example, catalog 22 may include data for parts or equipment associated with any industry, including, for example, construction equipment (e.g. work machines, such as excavators, hauling vehicles, and track-type tractors), power generation equipment, appliances, vehicles, aircraft, etc. Any kind of information may be included about parts stored in catalog 22. For example, exemplary parts data may include size, materials, weight, price, shipping costs, etc.

The disclosed parts catalog system may be applicable to facilitate research, development, and/or repair of components or machines, as well as to supplying of parts. As such, various entities, including, for example, design engineers, service providers (e.g., service representatives, technicians, etc.), parts suppliers (a.k.a. vendors), as well as equipment and/or parts retailers and rentors may utilize the disclosed system. A host organization may host, maintain, or serve as administrator of the disclosed system. Any entity may serve as a host organization, including businesses, educational institutions, medical facilities, and parts dealers (e.g., suppliers, retailers, etc.). A host organization may be independent or may be one of the types of entities discussed above. A host organization may provide access to the disclosed system to members of the host organization. Alternatively or additionally, a host organization may offer access to the disclosed system to one or more users and/or entities outside of the host organization.

In some embodiments, access to system 10 may be offered to more than one of these entities and thereby made available to a greater user base by configuring system 10 to distinguish between different classes of users.

System 10 may also be configured to determine the security access level assigned to each user/class, and to give access to some portion of the capabilities of system 10 and/or some portion of catalog 22 commensurate with the assigned security access level.

An exemplary method of using system 10 may include accessing database 20 (e.g., including catalog 22) and navigating within system 10 via GUI 16. Such a method may also include inputting data into a data field integrated with a graphical representation displayed by GUI 16 illustrating the physical significance of the data within the data field. The step of inputting data may include inputting an input value in a first of two possible input formats including a data entry format and a pulldown menu selection format and toggling to a second of the two input formats. The method may further include retrieving data for a hardware item having a part number with a first format by inputting the part number in a second format.

An exemplary method of using system 10 may include choosing to navigate system 10 with one of two possible navigation systems including a tree-based menu system and a graphics-based system. Such use may further include switching between the two navigation systems.

An exemplary method of using system 10 may include toggling back and forth between search results displayed in metric units and search results displayed in standard units. Such toggling may include converting the attribute data of the displayed hardware items from metric to standard units and from standard to metric units. Alternatively or additionally toggling may include retrieving a different set of hardware items for metric units than for standard units.

The disclosed parts catalog system may provide users with a flexible tool with which to search for and/or retrieve data regarding hardware items stored in a parts catalog. Navigation using system 10 may be accomplished using either of two types of navigation systems. System 10 may be provided with a graphics-based navigation system, as well as a tree-based menu navigation system, thus providing users with multiple options for navigating system 10. Both the graphics-based system and the tree-based menu system may each provide intuitive navigation. The tree-based menu system may have a logical flow, with various sub-menus being displayed readily under one or more main menus. The graphics-based system may offer evident visual indications of the equipment, components, and hardware items for which data is stored in the catalog. Finding a desired part may be made easier for a broad base of users because users have flexibility as to how they navigate system 10. Users can choose the navigation system that suits their preference or they may choose the navigation system that is best suited to efficiently and rapidly finding the particular part sought after. In addition, the integration of data fields with a graphical-representation of a hardware item may provide additional intuitiveness to using system 10, especially when dealing with complicated hardware items or items not familiar to the user.

It will be apparent to those having ordinary skill in the art that various modifications and variations can be made to the disclosed parts catalog system without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. A parts catalog system, comprising:
   a processor;
   a computer-readable medium operatively coupled to the processor and including a memory in which is stored a database configured to catalog collections of data associated with and identifying hardware items;
   a graphical user interface (GUI) configured to display at least some of the data associated with and identifying a hardware item including:
   a graphical representation of the hardware item;
   a data field displayed visually integral with the graphical representation in a manner that illustrates a correlation between the data within the data field and at least one physical characteristic of the hardware item illustrated by the graphical representation, the data field being configured to accept input to designate a desired value for the data within the data field in order to search for one or more of the hardware items for which data is stored in the database;
   wherein the data field is displayed visually integral with the graphical representation by virtue of being at least one of:
   within boundaries of the graphical representation;
   overlapping the graphical representation; and
   accompanied by dimensioning graphics correlating the data field to a portion of the graphical representation, wherein the data field configured to accept input is a displayed visually linked component of the dimensioning graphics.

2. The system of claim 1, wherein the data field is configured to accept an input value in two input formats including a data entry format and a pulldown menu selection format by toggling between the two input formats; and
   wherein the data field is configured to maintain the input value during the toggling.

3. The system of claim 1, wherein the system includes a part number search feature, which enables the system to accept part number queries in multiple formats, determine the proper format based on a set of rules, correct the format of the part number and search an appropriate subcategory of the database for the corrected part number.

4. The system of claim 1, wherein navigation within the system may be accomplished with either of two navigation systems including a tree-based menu system and a graphics-based system by switching between the two navigation systems.

5. The system of claim 1, wherein user access is regulated based on a plurality of security access categories.

6. The system of claim 5, wherein a security access category for a user is based on whether or not a user is an in-house user of an organization hosting the system or an outside user.

7. The system of claim 5, wherein a security access category for a user is based on at least one of the type of work a user does, the geographic region in which the user works, and the business facility at which the user works.

8. The system of claim 1, further including a toggle feature whereby a user may toggle back and forth between search results displayed in metric units and search results displayed in standard units.

9. The system of claim 8, wherein the system is configured, via the toggle feature, to convert the attribute data of the displayed hardware items from metric to standard units and from standard to metric units.

10. The system of claim 8, wherein the system is configured, via the toggle feature, to retrieve a different set of hardware items for metric units than for standard units.

11. A method of using a parts catalog system, comprising:
   accessing a database configured to catalog collections of data associated with and identifying hardware items;
   navigating within the system via a graphical user interface (GUI) configured to display at least some of the data associated with and identifying a hardware item including a graphical representation of the hardware item; and
   inputting data into a data field displayed visually integral with the graphical representation in a manner that illustrates a correlation between the data within the data field and at least one physical characteristic of the hardware item illustrated by the graphical representation in order to search for one or more of the hardware items for which data is stored in the database;
   wherein the data field is displayed visually integral with the graphical representation by virtue of being at least one of:
   within boundaries of the graphical representation;
   overlapping the graphical representation; and
   accompanied by dimensioning graphics correlating the data field to a portion of the graphical representation, wherein the data field configured to accept input is a displayed visually linked component of the dimensioning graphics.

12. The method of claim 11, wherein the step of inputting data includes inputting an input value in a first of two possible input formats including a data entry format and a pulldown menu selection format,
   the method further including toggling to the second of the two input formats;
   maintaining the input value in the data field during the toggling.

13. The method of claim 11, further including retrieving data for a hardware item having a part number with a first format by inputting the part number in a second format.

14. The method of claim 11, further including choosing to navigate with one of two possible navigation systems including a tree-based menu system and a graphics-based system by switching between the two navigation systems.

15. The method of claim 11, wherein accessing the catalog is accomplished under authorization to access one of a plurality of security access categories.

16. The method of claim 15, wherein the security access category is based on whether or not a user is an in-house user of an organization hosting the system or an outside user.

17. The method of claim 15, wherein the security access category is based on at least one of the type of work a user does, the geographic region in which the user works, and the business facility at which the user works.

18. The method of claim 11, further including toggling back and forth between search results displayed in metric units and search results displayed in standard units.

19. The method of claim 18, wherein the toggling includes converting the attribute data of the displayed hardware items from metric to standard units and from standard to metric units.

20. A method of using a parts catalog system, comprising:
   accessing a database configured to catalog collections of data associated with and identifying hardware items;
   navigating within the system via a graphical user interface (GUI) configured to display at least some of the data associated with and identifying a hardware item including a graphical representation of the hardware item;
   inputting data into a data field displayed visually integral with the graphical representation in a manner that illustrates a correlation between the data within the data field and at least one physical characteristic of the hardware item illustrated by the graphical representation in order to search for one or more of the hardware items for which data is stored in the database; and
   choosing to navigate with one of two possible navigation systems including a tree-based menu system and a graphics-based system by switching between the two navigation systems;
   wherein the data field is displayed visually integral with the graphical representation by virtue of being at least one of:
   within boundaries of the graphical representation;
   overlapping the graphical representation; and
   accompanied by dimensioning graphics correlating the data field to a portion of the graphical representation, wherein the data field configured to accept input is a displayed visually linked component of the dimensioning graphics.

* * * * *